United States Patent [19]
Maers

[11] Patent Number: 5,667,311
[45] Date of Patent: Sep. 16, 1997

[54] PIVOT SHAFT FOR A DAMPER ASSEMBLY

[76] Inventor: Walter Maers, 84 Fairview Ave., Islip Terrace, N.Y. 11752

[21] Appl. No.: 410,662

[22] Filed: Mar. 27, 1995

[51] Int. Cl.$^6$ ............................................... F16C 17/02
[52] U.S. Cl. ................................... 384/441; 384/903
[58] Field of Search ................................... 384/901, 130, 384/903, 441, 428

[56]         References Cited

U.S. PATENT DOCUMENTS

| | | | |
|---|---|---|---|
| 501,727 | 7/1893 | Moore | 384/901 |
| 5,020,923 | 6/1991 | Heitz et al. | 384/901 |
| 5,102,239 | 4/1992 | Momose et al. | 384/901 |

*Primary Examiner*—Lenard A. Footland
*Attorney, Agent, or Firm*—Galgano & Burke

[57]         ABSTRACT

A pivot shaft for a damper assembly includes a steel cylinder having a reduced diameter end, a brass sleeve bearing rotatably mounted on the reduced diameter end and a steel cap press fit over the bearing thereby enclosing it and protecting it from the environment. The area enclosed by the steel cap is preferably lubricated with grease before the cap is pressed onto the bearing. The possibility of galling is prevented by the use of a brass bearing between two steel members. The steel cap protects the lubricated bearing from dust and dirt. According to a first embodiment, the sleeve bearing and cap are provided at one end of the pivot shaft. With this embodiment, a closed end bushing is also provided which ensures that only the cap of the pivot shaft engages the bushing. According to a second embodiment, a first solid steel cylinder is provided with two reduced diameter portions, one at each end. A brass sleeve bearing is placed on each reduced diameter portion and retaining clips are attached to hold each sleeve bearing onto its respective reduced diameter portion. A second and third steel cylinders are provided, each having a bearing receiving bore in one end. The bored ends of the second and third steel cylinders are press fit over respective brass sleeve bearings. The resulting pivot shaft has three independently rotatable portions. In an alternate embodiment, the second and third cylinders are rigidly fixed together to thereby rotate together in tandem.

7 Claims, 5 Drawing Sheets

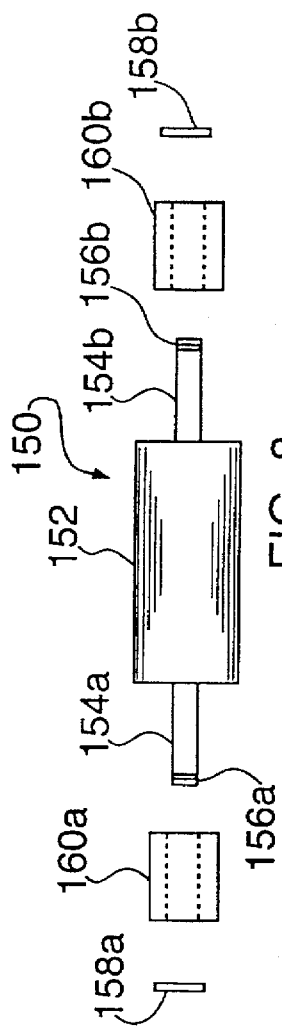
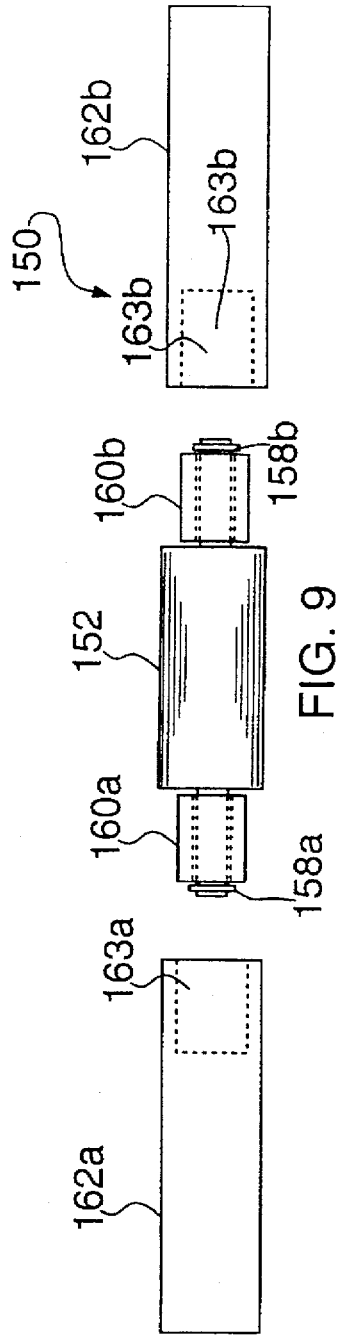
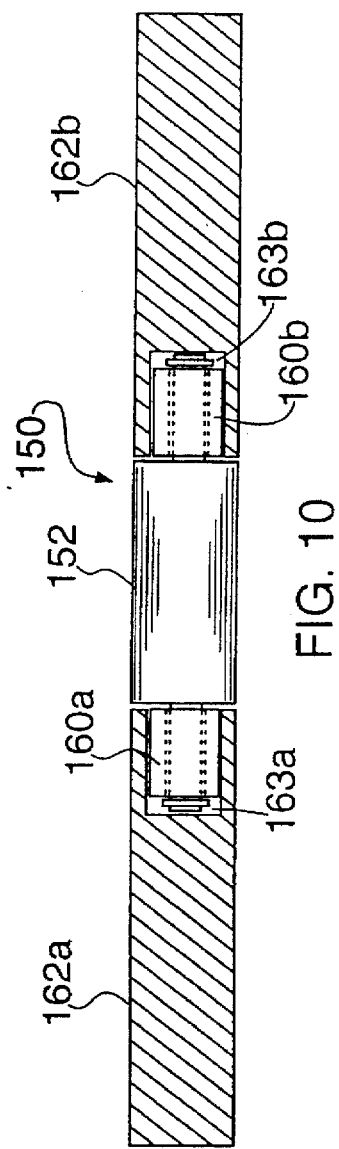

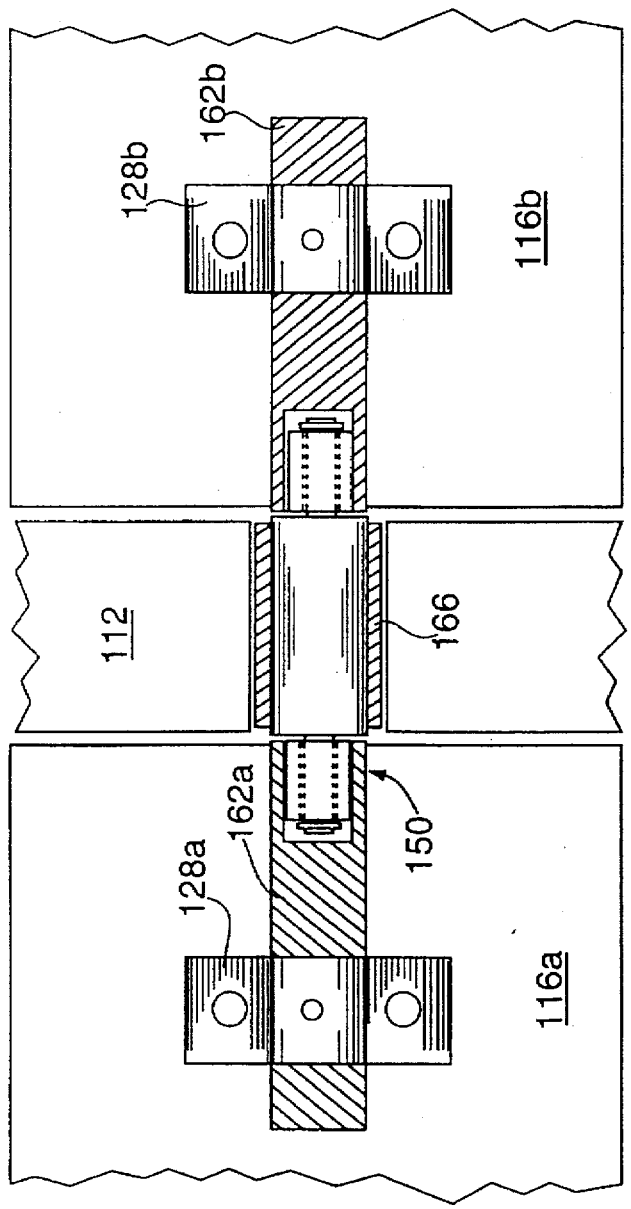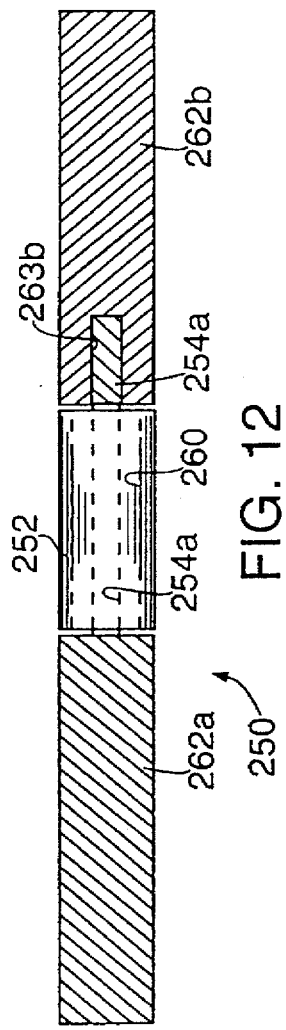

PIVOT SHAFT FOR A DAMPER ASSEMBLY

BACKGROUND OF THE INVENTION

1. Field of the Invention

The invention relates to pivot shafts used in ventilator dampers. More particularly, the invention relates to a pivot shaft having an enclosed sleeve bearing and a closed end bushing.

2. State of the Art

Ventilation systems are controlled by dampers which open and close to regulate the flow of air through the system. A typical damper assembly 10 is shown in prior art FIG. 1 and includes a housing having a pair of sidewalls 12, 14 between which a plurality of vanes 16, 18 are pivotally mounted. The vanes 16, 18 are mounted to the sidewalls 12, 14 by pivot shafts or pins 20, 22, 24, 26 which are typically steel cylinders approximately three inches long and approximately one half inch in diameter. The pins are attached to the vanes by straps 28, 30, 32, 34 which are bolted to the vanes. The free end of each pin is inserted through a hole in one of the side walls as seen in prior art FIG. 2. For example, the free end of pin 22 is inserted through a bushing 23 which is held in a hole 15 in the sidewall 14. The vanes are thus mounted so that they may be rotated via a controlling arm 36 which is coupled to a motor (not shown) so that the damper can be opened or closed.

It is well known that dampers become jammed for a variety of reasons. Most commonly, dust and dirt which normally accumulates inside a ventilator system builds up around the pivot pins in the holes in the sidewalls of the damper assembly. This causes the pivotal joint to become frozen so that the vanes cannot be moved. Depending on the type of bushing used, the pivot joints can also freeze due to galling (metal to metal bonding) of the housing and/or bushing to the pin.

The failure of jammed dampers is a serious health and safety problem in large buildings which rely on a ventilator system in lieu of opening windows. For example, during the World Trade Center explosion, many people suffered from smoke inhalation because the building was not properly ventilated due to frozen dampers. In addition, what is now commonly known as "toxic building syndrome" or indoor air pollution is the direct result of frozen ventilator dampers.

SUMMARY OF THE INVENTION

It is therefore an object of the invention to provide a pivot shaft for use in a damper assembly which is protected from freezing.

It is also an object of the invention to provide a pivot shaft for use in a damper assembly which is protected from galling.

It is another object of the invention to provide a pivot shaft for use in a damper assembly which is protected from dust build up.

It is still another object of the invention to provide a pivot shaft for use in a damper assembly which is easily retrofitted to existing damper assemblies.

In accord with these objects which will be discussed in detail below, the pivot shaft of the present invention includes a solid steel cylinder having a portion which is shoulder cut to a reduced diameter, a brass sleeve bearing placed on the reduced diameter portion and held by a retaining clip so that it is freely rotatable about the reduced diameter portion. A steel cap is pressed over the brass sleeve bearing thereby enclosing it and protecting it from the environment. The area enclosed by the steel cap is preferably lubricated with grease before the cap is pressed onto the bearing. The possibility of galling is prevented by the use of a brass sleeve bearing between two steel members. The steel cap protects the lubricated bearing from dust and dirt. According to a first embodiment of the invention, the sleeve bearing and cap are provided at the end of the pivot shaft. With this embodiment, a closed end bushing is also provided which ensures that only the cap of the pivot shaft engages the bushing. According to a second embodiment, a first solid steel cylinder is provided with two reduced diameter portions, one at each end. A brass sleeve bearing is placed on each reduced diameter portion and retaining clips are attached to hold each sleeve bearing onto its respective reduced diameter portion. A second and third steel cylinders are provided, each having a bearing receiving bore in one end. The bored ends of the second and third steel cylinders are press fit over respective brass sleeve bearings. The resulting pivot shaft has three independently rotatable portions. The second embodiment of the invention is useful in dampers having a horizontal bank of vanes.

Certain of the foregoing and related objects are also attained in a pivot shaft for a damper assembly which includes a first substantially solid cylindrical member having a first reduced diameter end portion, a substantially cylindrical sleeve bearing rotatably mounted on the first reduced diameter end portion, a second substantially solid cylindrical member having a bearing receiving end bore into which the tip of the first reduced diameter end portion is fixedly received. As a result, the first substantially solid cylindrical member and the second substantially solid cylindrical member are mutually axially rotatable together in tandem relative to the sleeve bearing.

Additional objects and advantages of the invention will become apparent to those skilled in the art upon reference to the detailed description taken in conjunction with the provided figures.

BRIEF DESCRIPTION OF THE DRAWINGS

FIG. 8 is a view similar to FIG. 3 of a second embodiment of the invention;

FIG. 9 is a view similar to FIG. 4 of the second embodiment of the invention;

FIG. 10 is a view similar to FIG. 5 of the second embodiment of the invention;

FIG. 11 is a view similar to FIG. 7 of the second embodiment of the invention; and FIG. 12 is a sectional view, in part elevation, of a further embodiment of the invention.

DETAILED DESCRIPTION OF THE PREFERRED EMBODIMENTS

Figure 4:
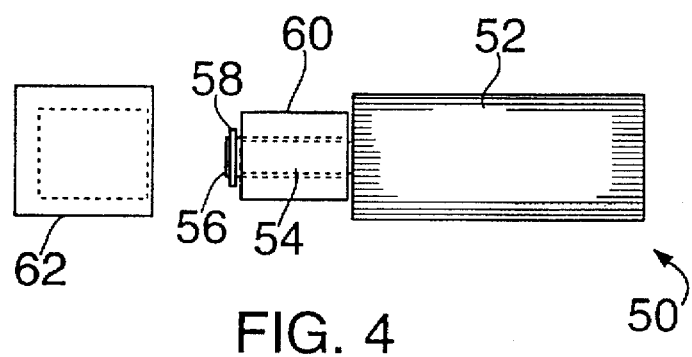
FIG. 4 is a view similar to FIG. 3 showing the pivot shaft partially assembled.
Figure 5:
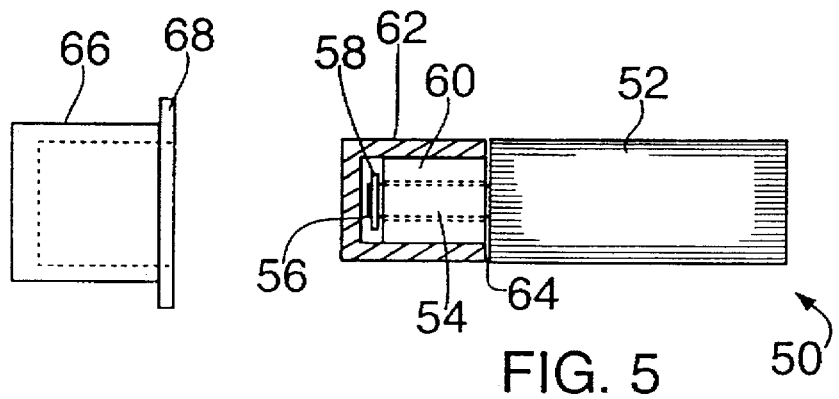
FIG. 5 is a view similar to FIG. 4 showing the pivot shaft assembled with a closed end bushing.
Figure 6:
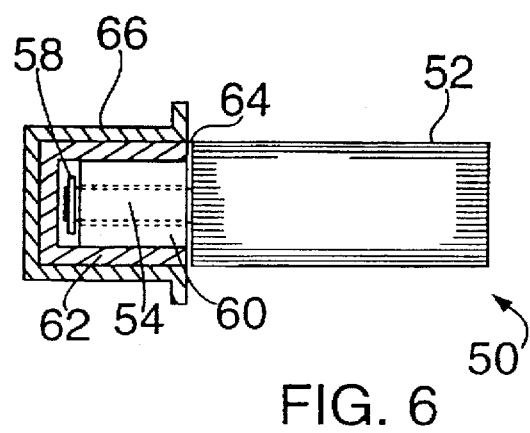
FIG. 6 is a view similar to FIG. 5 showing the assembled pivot shaft inserted into the closed end bushing.

Referring now to FIGS. 3 through 6, a pivot shaft 50 according to the invention includes a solid steel cylinder 52 which has a shoulder cut reduced diameter end portion 54. The end portion 54 is provided with an annular groove 56 for receiving a retainer clip 58 as described below. The cylinder is preferably approximately three inches long and has a diameter of approximately one half inch except for the reduced diameter portion 54 which has a diameter of approximately one quarter inch. The length of the reduced diameter portion is preferably approximately one half inch. A brass sleeve bearing 60 having an inner diameter slightly larger than one quarter inch and an outer diameter of approximately three eighths of an inch is rotatably mounted on the reduced diameter portion 54 of the cylinder 52 as shown in FIG. 4. The retainer clip 58 is snapped into the annular groove 56 to prevent the bearing 60 from moving longitudinally off the reduced diameter part 54. If desired, a conventional lubricant or grease is applied to the area between the bearing 60 and the reduced diameter portion 54. An end cap 62, having an inner diameter slightly less than the outer diameter of the bearing 60 is pressed or force fit onto the bearing as shown in FIG. 5. The end cap 62 preferably has an outer diameter which is substantially equal to the outer diameter of the cylinder 52, i.e. one half inch. From the foregoing, and with reference to FIG. 5, it will be appreciated that the end cap 62 effectively seals the area surrounding the bearing 60 except for a narrow annular gap 64 between the cap 62 and the cylinder 52. The narrow gap 64 is provided to allow free rotation of the end cap 62 and the bearing 60 about the reduced diameter portion 54 of the cylinder 52.

According to a presently preferred embodiment of the pivot shaft, a closed end bushing 66 with an annular flange 68 is provided for mounting the pivot shaft 50 in the side wall of a damper housing. The bushing 66 is dimensioned so that only the end cap 62 of the pivot shaft 50 is engaged by the bushing 66 and/or the housing of the damper assembly. This assures that the cylinder 52 never engages any part of the damper assembly except for the vane to which it is attached.

Figure 1:
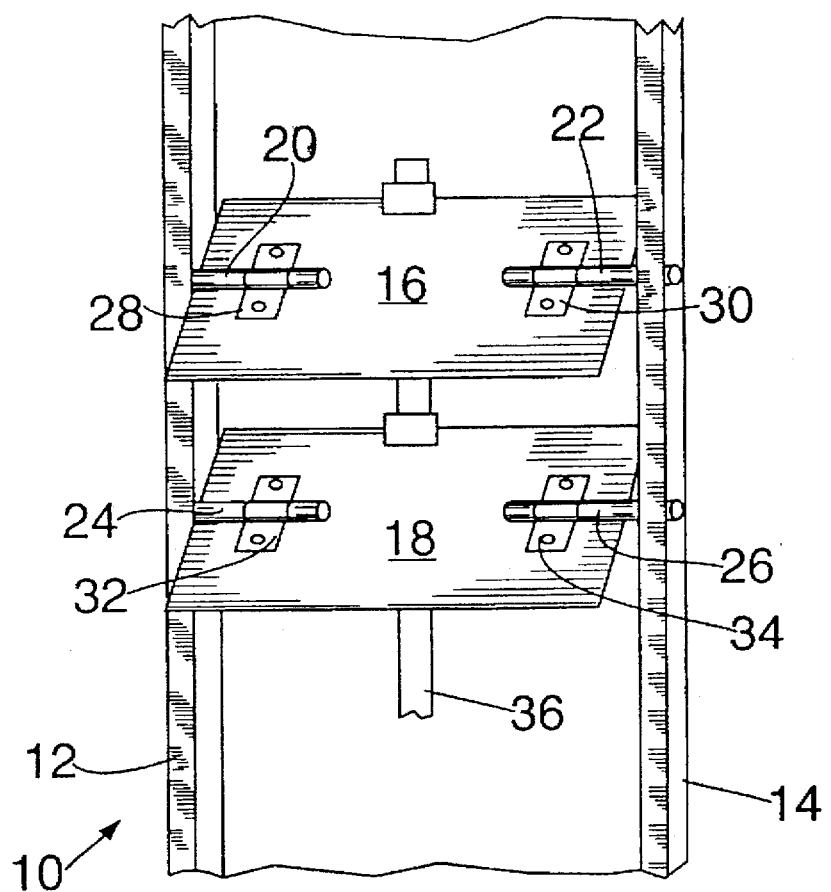
FIG. 1 is a broken perspective view of a prior art damper assembly.
Figure 2:
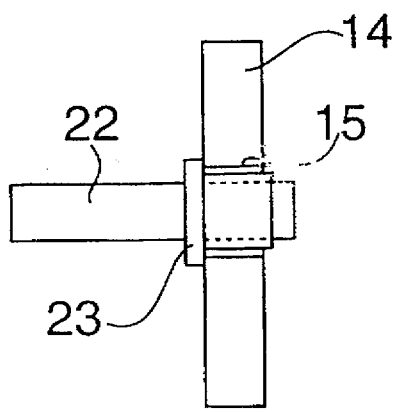
FIG. 2 is a broken enlarged view in partial section of a portion of the damper assembly of FIG. 1.
Figure 3:
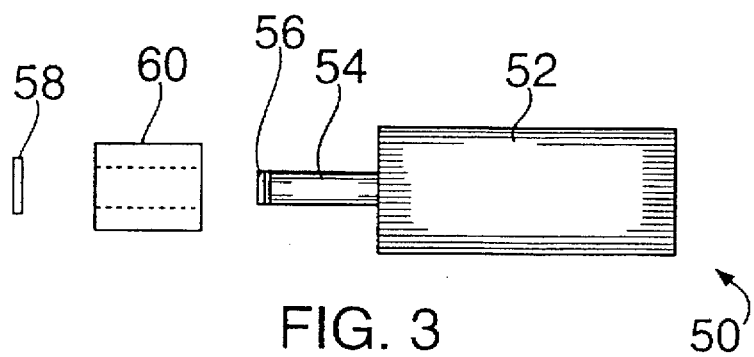
FIG. 3 is an exploded side elevation view of components of the pivot shaft according to the invention.
Figure 7:
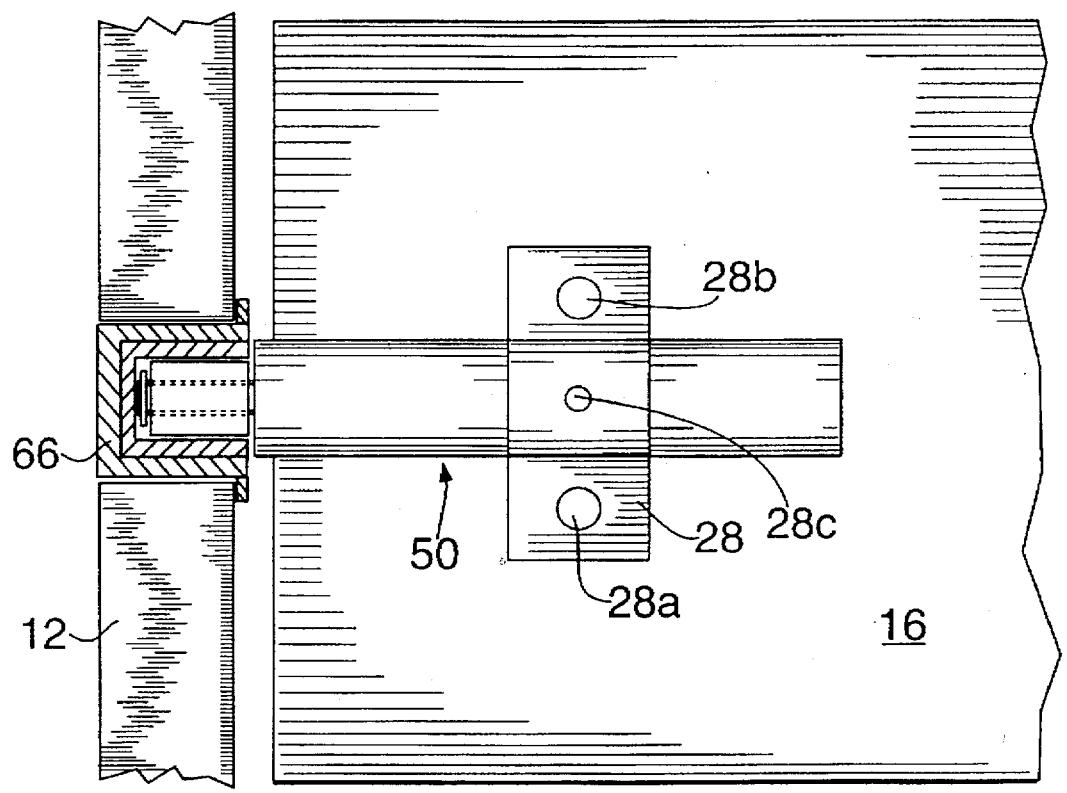
FIG. 7 is a view similar to FIG. 6 showing how the pivot shaft is mounted in a damper assembly.

Referring now to FIGS. 1 and 7, those skilled in the art will appreciate that the pivot shaft 50 and its associated bushing 66 is easily retrofitted to an existing damper assembly by removing the straps 28 (30, 32, 34) from the vanes 16 (18) and replacing the pins 20 (22, 24, 26) with pivot shafts 50. As shown in FIG. 7, the straps 28 (30, 32, 34) are bolted to the vanes 16 (18) with bolts 28a, 28b and a set screw 28c is provided in the straps to assure a firm coupling of the pivot shaft to the vane.

Referring now to FIGS. 8 through 10, a second embodiment of a pivot shaft 150 according to the invention includes a first solid steel cylinder 152 which has two shoulder cut reduced diameter end portions 154a, 154b. Each end portion 154a, 154b is provided with an annular groove 156a, 156b for receiving a retainer clip 158a, 158b as described below. The first cylinder is preferably approximately one and one half inches long and has a diameter of approximately one half inch except for the reduced diameter portions 154a, 154b which have a diameter of approximately one quarter inch. The length of each reduced diameter portion is preferably approximately one half inch. A brass sleeve bearing 160a, 160b having an inner diameter slightly larger than one quarter inch and an outer diameter of approximately three eighths of an inch is rotatably mounted on each reduced diameter portion 154a, 154b of the first cylinder 152 as shown in FIG. 9. The retainer clips 158a, 158b are snapped into respective annular grooves 156a, 156b to prevent the bearings 160a, 160b from moving longitudinally off the reduced diameter portions 154a, 154b. If desired, a conventional lubricant or grease is applied to the area between the bearings 160a, 160b and the reduced diameter portions 154a, 154b. A second and third substantially solid steel cylinders 160a, 160b are each provided with an end bore 163a, 163b having an inner diameter slightly less than the outer diameter of the bearings 162a, 162b. Each of the second and third cylinders 162a, 162b is preferably approximately three inches long and has an outer diameter substantially equal to the outer diameter of the first steel cylinder. Each of the second and third steel cylinders 162a, 162b is pressed or force fit onto a respective bearing 160a, 160b as shown in FIG. 10. Those skilled in the art will appreciate that the assembled pivot shaft 150 shown in FIG. 10 has three independently rotatable parts 162a, 152, and 162b.

The pivot shaft 150 is useful in damper assemblies having a horizontal bank of vanes. FIG. 11 shows how the pivot shaft 152 is used to mount two horizontal vanes 116a, 116b. The first steel cylinder portion 152 of the pivot shaft 150 is mounted in the wall 112 of the damper assembly with a cylindrical bushing 166. The second and third cylinder portions 162a, 162b are coupled to respective vanes 116a, 116b as described above using straps 128a, 128b.

FIG. 12 illustrates an alternate embodiment of the pivot shaft 150 shown in FIGS. 8–11. In this embodiment, pivot shaft 250 includes a first steel cylinder portion 252 and second and third cylinder portions 262a, 262b. Second cylinder portion 262a has a shoulder cut reduced diameter end portion 254a and third cylinder portion 262b has an annular groove or bore 263b into which the tip of end portion 254a is press fit to rigidly fix cylinder portions 262a and 262b together. First steel cylinder bushing portion 252 is initially mounted on end portion 254a prior to said press fitting to allow for free rotation of cylinder portion 252; preferably cylinder portion 252 is provided with an internally disposed brass bushing sleeve 260 or is made of solid brass to allow for reliable free rotation thereof with respect to end portion 254a. As a result, second and third cylinder portions 262a, 262b are fixed to one another and will rotate together as one unit independently of first cylinder portion 252. Consequently, when pivot shaft 250 is used in a damper assembly having a horizontal bank of vanes such as that shown in FIG. 11, the rigid coupling of second and third cylinder portions 262a, 262b will cause the respective vanes 116a, 116b to which they are coupled to pivot together in tandem.

There have been described and illustrated herein several embodiments of a pivot shaft for a damper assembly. While particular embodiments of the invention have been described, it is not intended that the invention be limited thereto, as it is intended that the invention be as broad in scope as the art will allow and that the specification be read likewise. Thus, while particular dimensions have been disclosed, it will be appreciated that other dimensions could be utilized. Also, while brass and steel have been disclosed as preferred materials, it will be recognized that other types of metals or non-metals could be used with similar results obtained depending on the application. It will therefore be appreciated by those skilled in the art that yet other modifications could be made to the provided invention without deviating from its spirit and scope as so claimed.

What is claimed is:

1. A pivot shaft for use in a ventilation damper assembly, comprising:

a) a first substantially elongated solid cylindrical member having a first reduced diameter end portion;

b) a first substantially cylindrical sleeve bearing rotatably mounted on said first reduced diameter end portion; and c) a cup-shaped end cap having a bearing receiving end bore which is press fit over said first substantially cylindrical sleeve bearing, so that said first reduced diameter end portion is rotatable within said cup-shaped end cap.

2. A pivot shaft according to claim 1, further comprising:

d) a first retainer clip, wherein
said first reduced diameter end portion has an annular groove within which said first retainer clip is placed so that said first substantially cylindrical sleeve bearing is prevented from sliding off said first reduced diameter end portion.

3. A pivot shaft according to claim 1, further comprising:

d) a substantially cylindrical bushing have an open end and a closed end and a flange surrounding its open end, said cup shaped end cup being mounted in said substantially cylindrical bushing.

4. A pivot shaft according to claim 1, wherein:
said first substantially solid cylindrical member and said cup shaped end cup are steel, and
said first substantially cylindrical sleeve bearing is brass.

5. A pivot shaft for use in a ventilation damper assembly, comprising:

a) a first substantially elongated solid cylindrical member having a first reduced diameter end portion;

b) a first substantially cylindrical sleeve bearing rotatably mounted on said first reduced diameter end portion;

c) means for retaining said sleeve bearing on said first reduced diameter end; and d) a first end cap having a bearing receiving end bore which is press fit over said first substantially cylindrical sleeve bearing, so that said first reduced diameter end portion is rotatable within said end cap.

6. A pivot shaft in combination with a ventilation damper assembly, said pivot shaft comprising:

a) a first substantially elongated solid cylindrical member having a first reduced diameter end portion;

b) a first substantially cylindrical sleeve bearing rotatably mounted on said first reduced diameter end portion; and c) a cup-shaped end cap having a bearing receiving end bore which is press fit over said first substantially cylindrical sleeve bearing, so that said first reduced diameter end portion is rotatable within said cup-shaped end cap.

7. A pivot shaft in combination with a ventilation damper assembly, said pivot shaft comprising:

a) a first substantially elongated solid cylindrical member having a first reduced diameter end portion;

b) a first substantially cylindrical sleeve bearing rotatably mounted on said first reduced diameter end portion;

c) means for retaining said sleeve bearing on said reduced diameter end; and d) an end cap having a bearing receiving end bore which is press fit over said first substantially cylindrical sleeve bearing, so that said first reduced diameter end portion is rotatable within said end cap.

* * * * *